United States Patent
Ozkan et al.

[11] Patent Number: 5,946,045
[45] Date of Patent: Aug. 31, 1999

[54] SYSTEM FOR FORMING PROGRAM GUIDES AND VIDEO DATA FOR STORAGE AND TRANSMISSION IN DIFFERENT CODING FORMATS

[75] Inventors: Mehmet Kemal Ozkan; Kumar Ramaswamy; John Sidney Stewart, all of Indianapolis, Ind.

[73] Assignee: Thomson Consumer Electronics, Inc., Indianapolis, Ind.

[21] Appl. No.: 08/818,590

[22] Filed: Mar. 18, 1997

Related U.S. Application Data

[60] Provisional application No. 60/024,371, Aug. 1, 1996.

[51] Int. Cl.⁶ ............................................. H04N 7/00
[52] U.S. Cl. ............................................. 348/467; 348/906
[58] Field of Search ............................. 348/906, 467, 348/12, 13, 6, 569, 7, 10, 473, 469, 476, 461, 478, 426, 465

[56] References Cited

U.S. PATENT DOCUMENTS

| | | | |
|---|---|---|---|
| 5,151,789 | 9/1992 | Young | 358/194 |
| 5,200,823 | 4/1993 | Yoneda et al. | 348/473 |
| 5,319,707 | 6/1994 | Wasilewski et al. | 348/473 |
| 5,355,162 | 10/1994 | Yazolino et al. | 348/555 |
| 5,359,601 | 10/1994 | Wasilewski et al. | 348/906 |
| 5,477,263 | 12/1995 | O'Callaghan et al. | 348/7 |
| 5,576,755 | 11/1996 | Davis et al. | 348/906 |
| 5,585,866 | 12/1996 | Miller et al | 348/731 |
| 5,600,378 | 2/1997 | Wasilewski | 348/906 |
| 5,678,173 | 10/1997 | Mihara | 348/555 |
| 5,867,207 | 2/1999 | Chaney et al. | 348/906 |

FOREIGN PATENT DOCUMENTS

| | | |
|---|---|---|
| 624 979A2 | 11/1994 | European Pat. Off. . |
| 673 034A2 | 9/1995 | European Pat. Off. . |
| 782 332A2 | 7/1997 | European Pat. Off. . |
| 61-282411 | 6/1988 | Japan . |

OTHER PUBLICATIONS

"A Flexible Bit–rate Transmission System For Digital HDTV Outside Broadcasting By Satellite", by A. Morello, I.E.E.E.Proceedings Of The Global Telecommunications Conference (Globecome), vol. 3 of 4, pp. 1622–1627, Nov. 29, 1993.

"A 45–Mbit/sec. VLSI Viterbi Decoder For Digital video Applications", by G. Edwards, I.E.E.E. Commercial Applications And Dual Use Technology, pp. 127–130, Jun. 16, 1993.

MPEG Systems Standard (ISO/IEC 13818–1, Jun. 10, 1994), Section 2.4.4.

P.A. Sarginson, MPEG–2: A tutorial Introduction To The Systems Layer, IEEE Colloquim on MPEG What It Is And What It Isn't, Jan. 1995, pp. 4/1–4/13.

Search Report Attached.

*Primary Examiner*—Victor R. Kostak
*Attorney, Agent, or Firm*—Joseph S. Tripoli; Ronald H. Kurdyla; Alexander J. Burke

[57] ABSTRACT

Program Guide information is formed suitable for incorporation in a video program datastream and for storage on a storage medium or for broadcast in variable broadcast encoding formats. A method of formatting video data to be suitable for output on one of a plurality of output channels and in one of a plurality of encoding formats is employed. The method involves forming program guide information including a channel map associating an output channel with a video program. The program guide information also associates the channel map with an encoding format. The program guide information and the video data are incorporated into a datastream and the datastream is provided to an output channel. The method may also involve generating a parameter indicative of an encoding format and combining the encoding format parameter and the channel map in the program guide.

26 Claims, 5 Drawing Sheets

SYSTEM FOR FORMING PROGRAM GUIDES AND VIDEO DATA FOR STORAGE AND TRANSMISSION IN DIFFERENT CODING FORMATS

This is a non-provisional application of provisional application Ser. No. 60/024,371 by M. K. Ozkan et al, filed 1st Aug. 1996.

FIELD OF THE INVENTION

This invention is related to the field of digital signal processing, and more particularly to the formation of Program Guides and Video Data for storage and transmission in variable broadcast encoding formats.

BACKGROUND OF THE INVENTION

In video processing and storage applications, digital video data is typically encoded to conform to the requirements of a known standard. One such widely adopted standard is the MPEG2 (Moving Pictures Expert Group) image encoding standard, hereinafter referred to as the "MPEG standard". The MPEG standard is comprised of a system encoding section (ISO/IEC 13818-1, Jun. 10th 1994) and a video encoding section (ISO/IEC 13818-2, Jan. 20th 1995), hereinafter referred to as the "MPEG systems standard" and "MPEG video standard" respectively. Video data encoded to the MPEG standard is in the form of a packetized datastream which typically includes the data content of many program channels (e.g. content corresponding to cable television channels 1–125). In order for a decoder to decode the packetized datastream and to recover the video data content of selected program channels for display, for example, the individual packets that comprise the selected program channels must be identified and assembled.

In order to recover the content of selected program channels, information in a Program Guide is used in identifying and assembling individual data packets that constitute the selected programs. For this purpose Program Guide data is acquired from the program datastream that is input to a video decoder. The Program Guide data is formed into a Master Program Guide (MPG) sufficient to decode the selected programs. Once it is formed, the MPG may be used to decode the selected programs or it may be transmitted along with the data content of the selected programs to another application device. However, in some video transmission systems, it is necessary to acquire and form the MPG from Program Guide data encoded in variable broadcast encoding formats.

Variable broadcast encoding formats are used in wireless terrestrial video broadcast systems to selectively provide enhanced levels of broadcast signal noise immunity. However, a broadcast encoding format that provides enhanced noise immunity also requires increased transmission bandwidth. An example of a system that uses variable broadcast encoding formats is the proprietary Multipoint Microwave Distribution System (MMDS) which uses a "line-of-sight" transmission system. In such a system, an encoding format that provides a broadcast signal with a higher degree of immunity to noise also incurs a higher error correction coding overhead and consequently requires greater transmission bandwidth. Similarly, for a fixed transmission bandwidth, providing a broadcast signal with a higher degree of noise immunity reduces the information throughput that may be attained. Further, the encoding format used may be varied on a temporal or geographical basis to accommodate variations in reception conditions associated with atmospheric or landscape features.

The variation in broadcast modulation and error correction coding format and the associated required transmission bandwidth presents problems to a video receiver both in decoding the variable encoding formats and in acquiring a compatible MPG. These problems are addressed by a system according to the present invention.

SUMMARY OF THE INVENTION

The use of variable broadcast encoding formats may result in a variation in the transmission bandwidth available for program data content. The inventors have hereby recognized that the number of program channels that are transmitted using variable broadcast encoding formats may be changed in conjunction with encoding format. Further, the number of program channels may be varied both over time, and with broadcast area.

The inventors have further recognized that it is desirable to form Program Guide information to facilitate decoding of the video data in a receiver. The Program Guide information is formed and incorporated in a video program datastream for storage on a storage medium or for broadcast in variable broadcast encoding formats. This allows the signal noise immunity of the broadcast system to be tailored to the requirements of a particular distribution network or broadcast area. The transmitter and receiver may be configured to provide higher broadcast signal noise immunity in a particular distribution area where broadcast conditions are impaired.

In accordance with the principles of the present invention, a method of formatting video data to be suitable for output on one of a plurality of output channels and in one of a plurality of encoding formats is disclosed. The method involves forming program guide information including a channel map associating an output channel with a video program. The program guide information also associates the channel map with an encoding format. The program guide information and the video data are incorporated into a datastream and the datastream is provided to an output channel.

In a feature of the invention, the method also involves generating a parameter indicative of an encoding format and combining the encoding format parameter and the channel map in the program guide.

In another feature of the invention, a storage medium contains video data and associated program guide information including parameters indicative of coding type and modulation format suitable for use in decoding the video data following retrieval of the video data from the storage medium.

DETAILED DESCRIPTION OF THE DRAWINGS

Figure 1:
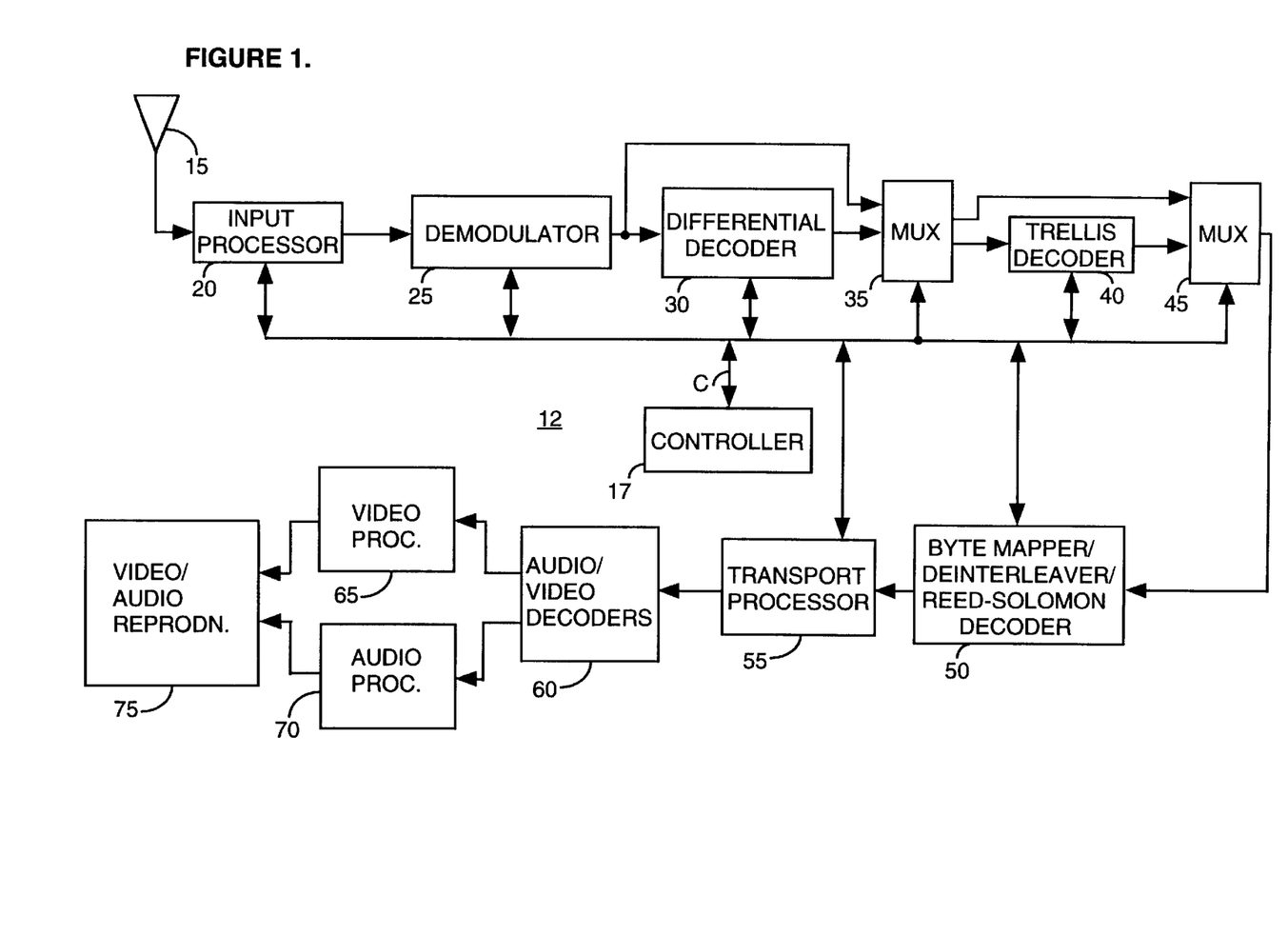
FIG. 1 is a block diagram of apparatus, according to the principles of the invention, for demodulating and decoding signals of variable broadcast encoding format for display.

FIG. 1 is a block diagram of a receiver system, according to the principles of the invention, for demodulating and decoding signals of variable broadcast encoding format for display. The receiver system automatically adaptively tunes to broadcast signals that are variable in: a) the number and the frequency allocation of the channels that are transmitted, b) the signal coding type e.g. trellis or non-trellis coded, and c) the modulation format e.g. formats using symbol constellations of 64 or 256 elements. Parameters indicative of coding type and modulation format are advantageously incorporated in Program Guide information within the transmitted signals in order to facilitate the receiving and decoding of the variable broadcast encoding formats.

The ability of the receiver system of FIG. 1 to adaptively receive variable broadcast encoding formats allows the signal noise immunity of the broadcast system to be tailored to the requirements of a particular broadcast area. For example, the receiver may be configured to provide higher broadcast signal noise immunity in a particular broadcast area where reception conditions are impaired due to hilly terrain. In such a mode, the receiver may be configured for a less noise sensitive modulation format e.g. using 64 elements (in preference to 256 elements) and trellis coded data, for example. However, the enhanced noise immunity encoding requires greater signal bandwidth which results in less bandwidth being available for program data content and therefore fewer program channels may be transmitted. Consequently, the receiver of FIG. 1 also adapts to variation in the number and the frequency allocation of the channels that are transmitted.

Although the disclosed system is described in the context of a system for receiving variable broadcast encoding format signals that are MPEG compatible, it is exemplary only. The principles of the invention may be applied to systems in which the transmission channels may vary in number or in frequency allocation, or to systems in which the coding type or modulation format may be varied. Such systems may include, for example, non-MPEG compatible systems, involving other types of encoded datastreams and other methods of conveying Program Guide information. Further, although the disclosed system is described as processing broadcast programs, this is exemplary only. The term 'program' is used to represent any form of packetized data such as telephone messages, computer programs, internet data or other communications, for example.

In overview, in the video receiver system 12 of FIG. 1, a carrier modulated with video data is received by antenna 15 and processed by unit 20. The resultant digital output signal is demodulated by demodulator 25. The demodulated output from unit 25, optionally differentially decoded by decoder 30, is provided to unit 50 via multiplexers (muxes) 35 and 45 following optional trellis decoding by trellis decoder 40. The optionally trellis decoded output from mux 45 is mapped into byte length data segments, deinterleaved and Reed-Solomon error corrected by unit 50. The corrected output data from unit 50 is processed by MPEG compatible transport processor 55 which separates data according to type based on an analysis of header information and provides synchronization and error indication information used in subsequent video data decompression. Compressed video and audio output data from processor 55 is decompressed by MPEG decoder 60 to provide audio and video output data to audio processor 70 and to video processor 65. Processors 65 and 70 format the audio and video signals to be suitable for reproduction by unit 75.

A video receiver user selects for viewing either a video channel or an on-screen menu, such as a program guide, by using a remote control unit (not shown to simplify drawing). System controller 17 uses the selection information, provided from the remote control unit, to appropriately configure the elements of FIG. 1 to receive, demodulate and decode the input signal coding type, including differential or non-differential codes, trellis or non-trellis codes, and input signal modulation format, including 64 or 256 element symbol constellations. Elements 20, 25, 30, 40, 50 and 55 of FIG. 1 are individually configured for the input signal type by setting control register values within these elements and by selecting signal paths via muxes 35 and 45 using a bi-directional data and control signal bus C. It is to be noted that the demodulator and decoder functions implemented by units 20, 25, 30, 40 and 50 are individually known and generally described, for example, in the reference text *Digital Communication*, Lee and Messerschmidt (Kluwer Academic Press, Boston, Mass., USA, 1988).

Considering FIG. 1 in detail, a carrier modulated with video data received by antenna 15, is converted to digital form and processed by input processor 20. Processor 20 includes radio frequency (RF) tuner and intermediate frequency (IF) mixer and amplification stages for down-converting the input video signal to a lower frequency band suitable for further processing. In this exemplary system, the input signal received by the antenna contains 33 Physical Transmission Channels (PTCs 0–32). Each Physical Transmission Channel (PTC) is allocated a 6 MHz bandwidth and contains up to 6 video channels e.g. corresponding to cable TV channels 2–7.

It is assumed for exemplary purposes that a video receiver user selects a video channel (SC) for viewing using a remote control unit (not shown to simplify drawing). System controller 17 uses the selection information provided from the remote control unit to appropriately configure the elements of system 12 to receive the PTC corresponding to the selected video channel SC. Following down conversion, the output signal from unit 20 for the selected PTC has a bandwidth of 6 MHz and a center frequency in the range of 119–405 MHz.

Controller 17 configures the radio frequency (RF) tuner and intermediate frequency (IF) mixer and amplification stages of unit 20 to receive the selected PTC. The down-converted frequency output for the selected PTC is demodulated by unit 25. The primary functions of demodulator 25 are recovery and tracking of the carrier frequency, recovery of the transmitted data clock frequency, and recovery of the video data itself.

A carrier recovery loop in unit 25 processes the output from unit 20 to recover baseband video information. The data from unit 20 is a binary datastream representing a symbol sequence where each symbol is represented by assigned digital values. A set of symbols may be represented in a complex plane as a set of points called a symbol constellation, as known. The variable broadcast signal formats that are input to system 12 use Quadrature Amplitude Modulated (QAM) symbol constellations of either 64 or 256 points. The carrier recovery loop function in unit 25 compensates for symbol point offset and symbol point rotation caused by phase and frequency jitter in the carrier frequency introduced by the transmission channel and the instability of the oscillators in the low-noise-block (LNB) downconverter, as known.

The unit 25 carrier recovery loop derives a carrier offset value representing the symbol point rotation induced by the frequency error between the transmitted and derived carrier frequency of the selected PTC. The derived carrier offset value is used by the unit 25 carrier recovery loop to compensate for the symbol rotation induced by this frequency error. The carrier offset value in the exemplary embodiment does not significantly change between different PTCs. Consequently, once the carrier offset value is derived for one PTC it is stored by controller 17 and applied to the unit 25 carrier recovery loop to expedite the re-tuning of system 12 to other PTCs. The time required to re-tune system 12 to a different PTC is reduced by applying the stored carrier offset value to the unit 25 carrier recovery loop because the offset value accelerates recovery loop convergence. In order to compensate for frequency drift and other variations affecting carrier loop convergence, controller 17 provides that the carrier offset value is periodically derived and updated. System 12 may alternatively be configured to derive a carrier offset value specific to each PTC for use in carrier recovery loop compensation.

The unit 25 demodulator also incorporates an equalizer function used in conjunction with the carrier recovery loop for the purpose of compensating for transmission channel perturbations and for reducing inter-symbol interference, as known. In addition, a slicer in unit 25 applies a series of decision thresholds to the corrected output from the carrier recovery loop to recover the symbol sequence of the data that is input to demodulator 25. The slicer is configured by controller 17 for either a 64 point or 256 point QAM symbol constellation in response to the configuration Control signal C. The recovered video data output from unit 25 is provided to differential decoder 30.

Unit 25 also recovers sampling and synchronization clocks that correspond to transmitter clocks and are used for timing the operation of processor 20, demodulator 25 and differential decoder 30. The clocks are derived within unit 25 in accordance with known principles by deriving a phase and timing error signal based on a comparison of the slicer input and output data. The derived error signal is filtered and applied to the control input of a voltage controlled crystal oscillator to generate the clocks. Alternatively, a clock frequency greater than twice the symbol rate may be used as a sampling clock.

The output of demodulator 25 is optionally differentially decoded by unit 30 and passed to multiplexer 35. Differential encoding/decoding is a known technique used to overcome the problem associated with potential phase ambiguity in the derived carrier and recovered symbol constellation.

Controller 17 determines whether the input data is to be trellis decoded from parameters within the input data, or arbitrarily selects trellis decoding as part of an iterative initialization process. This initialization process is used for appropriately configuring system 12 to acquire and decode the received input data, as discussed later in connection with FIG. 2. If controller 17 selects a trellis decoding mode, either differentially decoded data from decoder 30 or demodulated data from unit 25 is passed via mux 35 to trellis decoder 40. Decoder 40 applies known trellis decoding principles to detect code sequences in trellis encoded data from mux 35. Decoder 40 determines from the data symbols received from mux 35 the most likely corresponding sequence of bits that would have been trellis encoded by the encoder and thereby identifies the corresponding transmitted data symbols. The resulting recovered original data is provided via mux 45 to unit 50. However, if controller 17 selects a non-trellis decoding mode, either differentially decoded data from decoder 30 or demodulated data from unit 25 is provided to unit 50, via muxes 35 and 45, bypassing trellis decoder 40.

The output from mux 45 is mapped into byte length data segments, deinterleaved and Reed-Solomon error corrected according to known principles by unit 50. In addition, unit 50 provides a Forward Error Correction (FEC) validity or lock indication to controller 17. Reed-Solomon error correction is a known type of Forward Error Correction. The FEC lock indication signals that the Reed-Solomon error correction is synchronized to the data being corrected and is providing a valid output.

The corrected output data from unit 50 is processed by MPEG compatible transport processor 55. The individual packets that comprise either particular program channel content, or Program Guide information, are identified by their Packet Identifiers (PIDs). Processor 55 separates data according to type based on an analysis of Packet Identifiers (PIDs) contained within header information and provides synchronization and error indication information used in subsequent video data decompression.

Individual packets that comprise a selected program channel are identified and assembled using PIDs contained in a Master Program Guide (MPG). However, the PIDs identifying the MPG packets are predetermined and stored in internal memory of controller 17. Therefore, after controller 17 determines from the FEC lock indication provided by unit 50 that system 12 is producing valid data to transport processor 55, the MPG which is present on every PTC may be acquired without additional PID information. Using Control signal C, controller 17 configures transport processor 55 to select the data packets comprising the MPG. Processor 55 matches the PIDs of incoming packets provided by mux 45 with PID values pre-loaded in control registers within unit 55 by controller 17. Controller 17 acquires a full MPG by accessing and assembling the MPG packets that are identified and captured by processor 55.

The information in the MPG that enables controller 17, in conjunction with processor 55, to identify data packets that comprise individual programs, is termed a channel map. Further, the MPG advantageously contains channel map information that permits identification of packets comprising individual programs for all the PTCs and for the different broadcast encoding formats. Different channel mappings are associated with different broadcast encoding formats because the maximum number of available Physical Transmission Channels (PTCs) is determined by the available transmission bandwidth for a particular encoding format. As previously explained, the use of an encoding format that provides greater signal noise immunity results in less bandwidth being available for program content transmission. The channel mappings may also be varied to allow variation in transmitted program content between different broadcast areas or to allow change, i.e., addition or deletion of services, in normal broadcast operations.

Controller 17 uses the channel map information in the acquired MPG to identify the packets comprising the video channel SC that the User selected to view. Processor 55 matches the PIDs of incoming packets provided by mux 45 with PID values of video channel SC pre-loaded in control registers within unit 55 by controller 17. In this manner, processor 55 captures video channel SC packets and forms them into an MPEG compatible datastream containing compressed video and audio data representing the selected video channel SC program content.

The compressed video and audio output data from processor 55 is decompressed by MPEG decoder 60 to provide audio and video output data to audio processor 70 and to video processor 65. Processors 65 and 70 format the audio and video signals to be suitable for reproduction by unit 75. It is to be noted that the MPEG compatible datastream incorporating the MPG output by processor 55 may alternatively be provided to a storage device for storage (not shown to simplify drawing).

Figure 2:
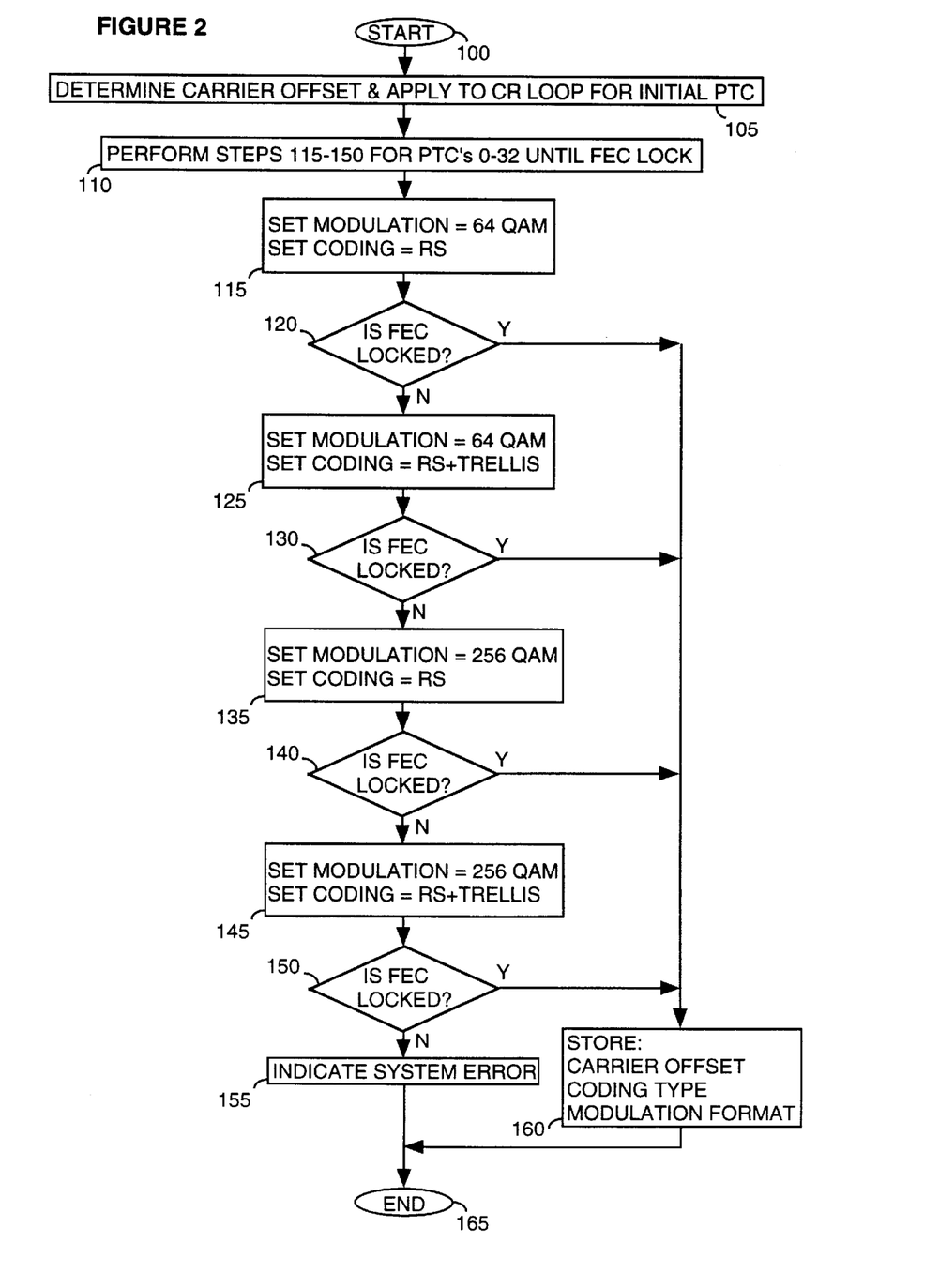
FIG. 2 shows a flowchart for a process for tuning a Forward Error Correcting decoder system to a signal of variable broadcast encoding format.

Controller 17 employs the process of FIG. 2 for tuning and configuring processor 20, demodulator 25, differential decoder 30 and trellis decoder 40 to receive a signal of variable broadcast encoding format, as previously discussed in connection with FIG. 1. The process of FIG. 2 automatically adaptively tunes system 12 to receive signals that are variable in: a) the number and the frequency allocation of the channels that are transmitted, b) the signal coding type e.g. trellis or non-trellis coded, or differential or non-differential coded, and c) the modulation format e.g. modulation formats using symbol constellations of 64 or 256 elements. The process of FIG. 2 is used when the FEC lock indication provided by unit 50 (FIG. 1) signals that lock has not been achieved. Such a condition may occur at a first time power-up or following a broadcast encoding format change at the encoder, for example. In the exemplary process of FIG. 2, the input data to system 12 is either, both differentially coded and trellis coded, or it is neither differentially coded nor trellis coded.

Following the start at step 100 of FIG. 2, a carrier offset value is derived in step 105 in the manner previously described in connection with FIG. 1. The carrier offset value is derived for an initial PTC e.g. PTC=0, and applied by controller 17 in step 105 to the unit 25 carrier recovery loop. In step 110, controller 17 is programmed to iteratively execute process steps 115–150 of FIG. 2 for each PTC, beginning with the first PTC (PTC=0) until FEC lock to one of the PTCs has been achieved.

In step 115, controller 17 configures demodulator 25 for a 64 QAM modulation format symbol constellation and configures muxes 35 and 45 to provide the output from demodulator 25 to unit 50 bypassing decoder 30 and trellis decoder 40. If controller 17 determines in step 120 that FEC lock has not been achieved by unit 50, controller 17 performs step 125 to configure demodulator 25 for a 64 QAM modulation format. In addition, controller 17 in step 125, configures decoder 30 and decoder 40 to differentially decode and trellis decode the output data from demodulator 25 to provide differentially decoded and trellis decoded data to unit 50 via muxes 35 and 45.

If controller 17 determines in step 130 that FEC lock has not been achieved by unit 50, controller 17 performs step 135 to configure demodulator 25 for a 256 QAM modulation format symbol constellation. Also controller 17, in step 135, configures muxes 35 and 45 to provide output data from demodulator 25 to unit 50 bypassing decoder 30 and trellis decoder 40. If controller 17 determines in step 140 that FEC lock has not been achieved by unit 50, controller 17 performs step 145 to configure demodulator for a 256 QAM modulation format. In addition, controller 17 in step 145, configures decoder 30 and decoder 40 to differentially decode and trellis decode the output data from demodulator 25 to provide differentially decoded and trellis decoded data to unit 50 via muxes 35 and 45.

If controller 17 in step 150 determines that unit 50 has not achieved FEC lock after iterating through steps 115–150 for each of the PTCs (PTCs 0–32), controller 17, in step 155, provides an indication of system error to the User. This may take the form of a panel light indication, or a default picture display on reproduction apparatus 75, or an error message conveyed by a telephone line or another type of fault indication. However, if unit 50 achieves FEC lock for any of the PTCs in steps 120, 130, 140 or 150, controller 17 performs step 160. In step 160, controller 17 stores in its internal memory the carrier offset value, the modulation format (either 64 or 256 QAM) and the coding type (either trellis or non-trellis coded) for the PTC for which FEC lock was acquired. Following completion of steps 155 or 160 the process of FIG. 2 terminates at step 165.

Figure 3:
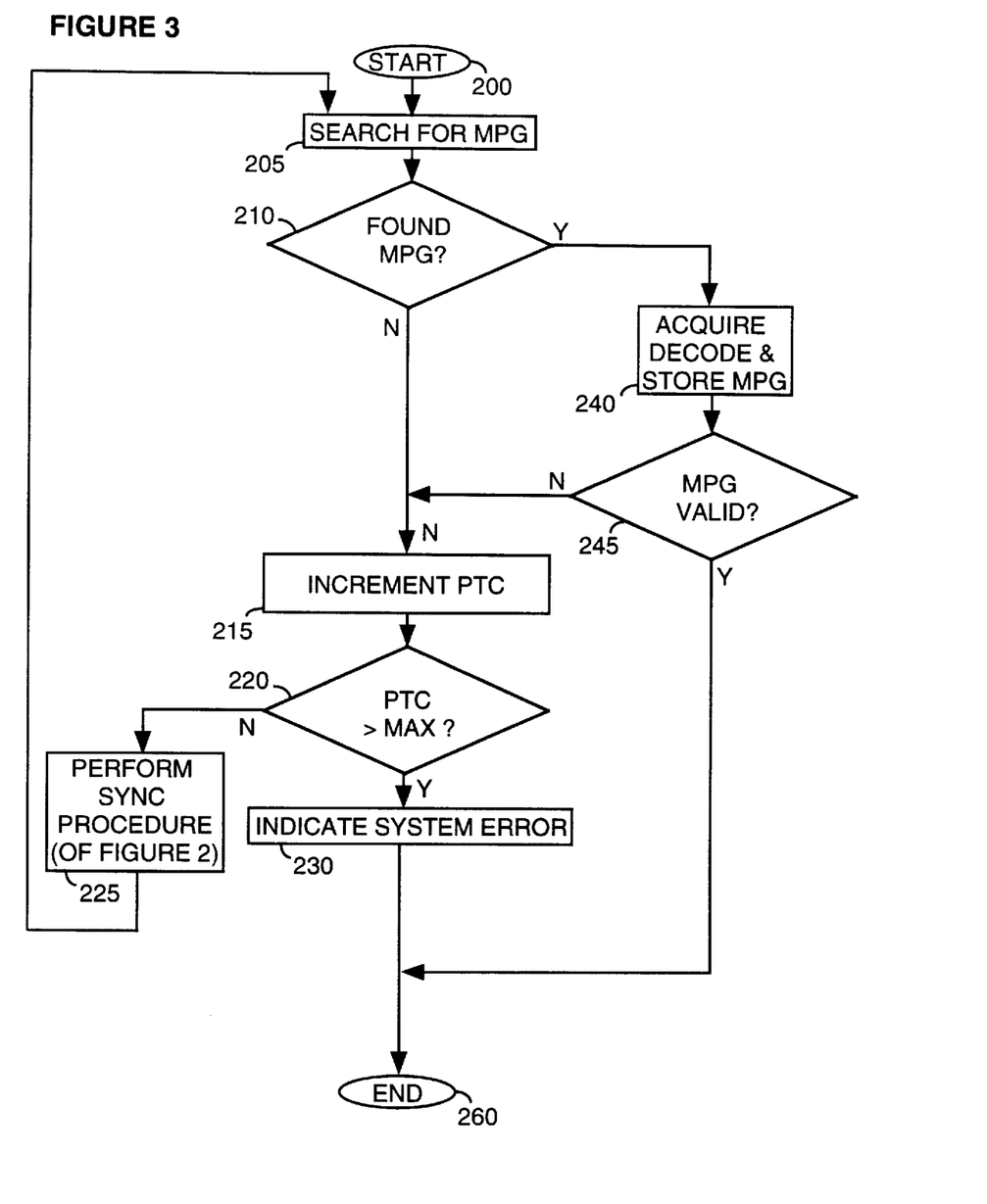
FIG. 3 shows a flowchart for a process for acquiring a Master Program Guide (MPG) from an input signal containing multiple Physical Transmission Channels (PTCs).

Controller 17 employs the process of FIG. 3 to acquire a Master Program Guide (MPG) from an input signal containing multiple Physical Transmission Channels (PTCs). The process of FIG. 3 is used following the FIG. 2 process for tuning system 12 to a particular PTC. However, the process of FIG. 3 may also be employed whenever acquisition of a new MPG is desired such as following a broadcast encoding format change at an encoder.

Following the start at step 200 of FIG. 3, controller 17 searches the data output from mux 45 (FIG. 1) for MPG data packets. As previously discussed in connection with FIG. 1, controller 17, in step 205, pre-loads internal registers within processor 55 with the MPG PID values. Processor 55 matches the MPG PID values against the PID values of the data packets input from mux 45 and captures the identified MPG data packets. Following detection of MPG data packets in step 210, controller 17, in step 240, transfers the MPG packets captured by processor 55 into internal memory. Controller 17 continues the step 240 process until a full, valid and error free MPG has been acquired decoded, and assembled in internal memory. If controller 17 determines, in step 245, that a full, valid and error free MPG has been acquired, execution of the FIG. 3 process is complete and terminates at step 260.

If controller 17 determines, in step 245, that a full, valid and error free MPG has not been acquired controller 17 configures system 12 (FIG. 1) to receive the next PTC in step 215, e.g. PTC number 1 if the current PTC is zero. Also, if MPG data packets are not detected by processor 55 in step 210, controller 17 similarly configures system 12 to receive the next PTC in step 215. However, if controller 17 determines, in step 220, that all available PTCs have been searched without success, controller 17 indicates a system error to the User in step 230. This may take the form of a panel light indication, or a default picture display on reproduction apparatus 75, or an error message conveyed by a telephone line or another type of fault indication.

If controller 17 determines, in step 220, that all available PTCs have not been searched, controller 17, in step 225, performs the previously described tuning process of FIG. 2 from step 115 (FIG. 2) for the PTC selected in step 215 (FIG. 3). This portion of the process of FIG. 2 is used to tune system 12 to the PTC selected in step 215 (FIG. 3). After tuning system 12 to the new PTC in step 225, controller 17 repeats the FIG. 3 process for acquiring a MPG beginning with step 205. Execution of the FIG. 3 process is complete and terminates at step 260 after either the generation of an error indication in step 230, or after step 245 and the successful acquisition of a MPG.

Figure 4:
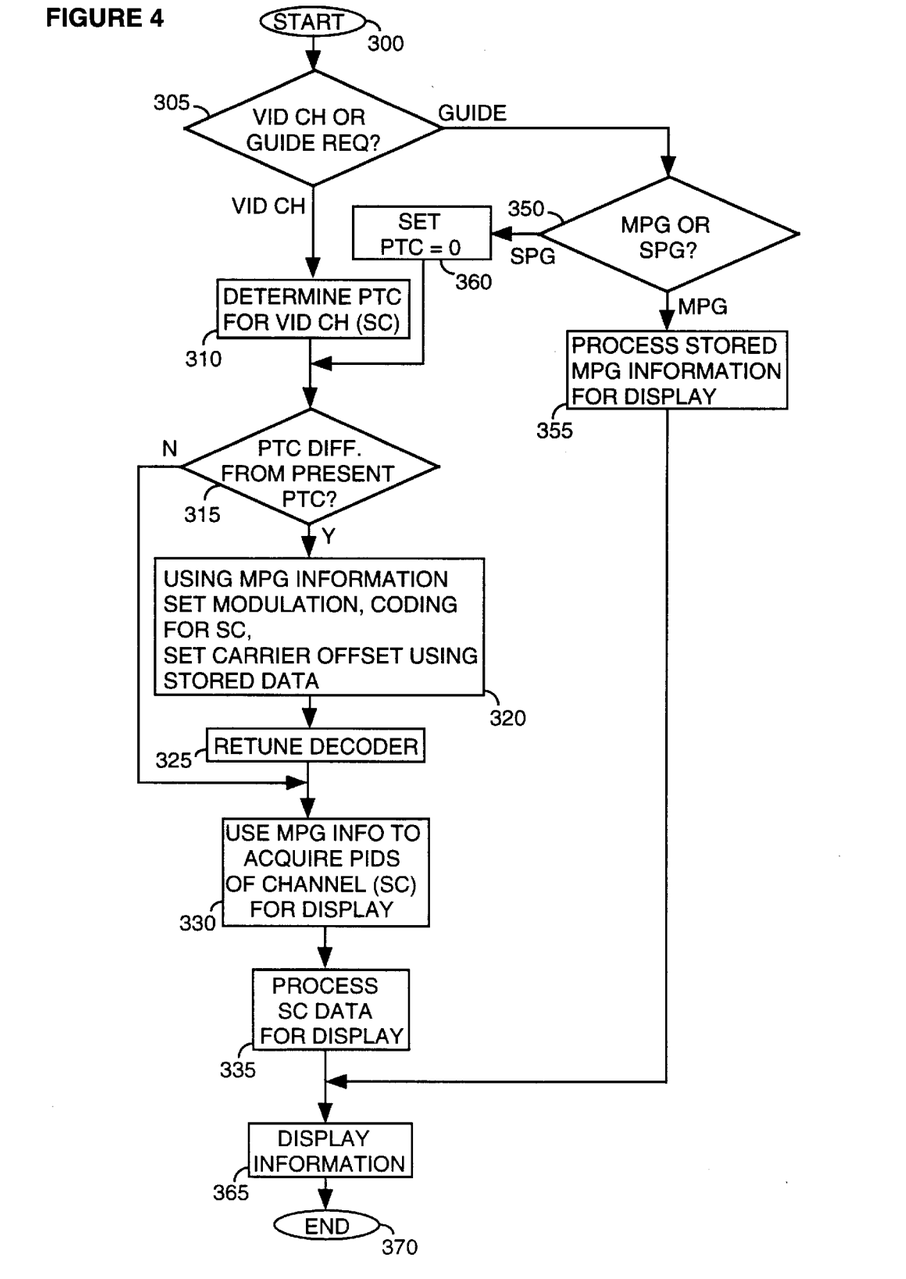
FIG. 4 shows a flowchart for a process for providing selected video channel or program guide information for display from an input signal containing multiple Physical Transmission Channels (PTCs).

Controller 17 employs the process of FIG. 4 to provide selected video channel or program guide information for display from an input signal containing multiple Physical Transmission Channels (PTCs) and variable modulation and coding formats. The process of FIG. 4 is used following the acquisition of a MPG by the process of FIG. 3, for example.

Following the start at step 300 of FIG. 4, controller 17, in step 305, determines from selection information provided from a remote control unit whether a User has requested a video channel or a program guide for viewing. If a video channel (SC) has been selected, controller 17 in step 310, determines on which PTC the selected channel SC is transmitted using previously stored MPG information. In step 315 controller 17 determines whether the PTC of the selected channel is different from the PTC to which system 12 is presently tuned. If the PTC of the selected channel is different from the present PTC, controller 17, in step 320, configures system 12 with the carrier offset value, modulation format (either 64 or 256 QAM) and the coding type (either trellis or non-trellis coding) of the required PTC. The modulation format and the coding type of the required PTC are determined by controller 17 from parameters within the stored MPG data. The carrier offset value for the required PTC is obtained by controller 17 from stored offset data previously determined in the acquisition process of FIG. 2.

In step 325, controller 17 performs the previously described tuning process of FIG. 2 from step 115 (FIG. 2). This portion of the process of FIG. 2 is used to tune system 12 to the PTC that was determined in step 310 (FIG. 3) and on which the selected video channel SC is transmitted. However, in step 315, if the PTC of the selected video channel SC is the same as the PTC to which system 12 is presently tuned, controller 17 bypasses step 320–325 and continues the process with step 330.

In step 330, controller 17 uses MPG data to identify the packets comprising the video channel SC that the User selected to view. As described in connection with FIG. 1, processor 55 matches the PIDs of incoming packets provided by mux 45 with PID values of video channel SC pre-loaded in control registers within unit 55 by controller 17. In this manner, processor 55 in step 335, governed by controller 17, captures video channel SC packets and forms them into an MPEG compatible datastream containing compressed video and audio data representing the selected video channel SC program content.

In step 365, the compressed video and audio output data from processor 55, as directed by controller 17, is decompressed by MPEG decoder 60 to provide audio and video output data to audio processor 70 and to video processor 65. In addition, in step 365, processors 65 and 70 format the audio and video signals to be suitable for reproduction by unit 75. The FIG. 4 process terminates at step 370.

However, if in step 305 a program guide is requested for viewing by the video receiver User, controller 17 in step 350 determines whether a Special Program Guide (SPG) or a MPG has been requested. The MPG is transmitted on every PTC and contains all the information required to identify and assemble packets that comprise a selected video channel program or an SPG. In contrast, a SPG is an optional guide and may be transmitted on only a limited number of the PTCs e.g. PTC=0. Further, there may be several different SPGs and an individual SPG may contain information on only selected video channels.

In the exemplary process of FIG. 4, an SPG is transmitted on PTC zero. Therefore, if in step 350 a SPG is requested for viewing, controller 17 in step 360 sets the required PTC as zero and continues execution of the FIG. 4 process from step 315 in the manner previously described. However, if in step 350 a MPG is requested for viewing, controller 17 in step 355 retrieves the MPG data previously stored in internal memory and in conjunction with processor 55, forms an MPG representative datastream. The resultant MPG representative datastream provided by processor 55 is an MPEG compatible datastream containing compressed video and audio data. In step 365, the compressed video and audio output data from processor 55 is decompressed by MPEG decoder 60 to provide audio and video output data to audio processor 70 and to video processor 65. In addition, in step 365, processors 65 and 70 format the audio and video signals to be suitable for reproduction by unit 75. The FIG. 4 process terminates at step 370.

The principles of the invention also apply to the formation, encoding and transmission of a datastream incorporating a MPG as described herein. The invention principles apply to the formation of a MPG incorporating channel map information that permits identification of packets comprising individual programs for all the PTCs and for the different broadcast encoding formats. The invention principles similarly apply to the formation of a MPG incorporating parameters indicative of modulation format and coding type.

A datastream formed according to the invention principles may be used for communication in a variety of applications including video server or PC type communication via telephone lines, for example. A video program datastream formed to incorporate a MPG according to invention principles may be recorded on a storage medium and transmitted or re-broadcast to other servers, PCs or receivers. Further, a video program may be stored in trellis coded or non-trellis coded form, for example.

If a program is stored in trellis coded form, the stored program guide information including modulation and coding type data, facilitates demodulation and decoding of the program by subsequent receivers upon retrieval and re-broadcast of the program. If a program is stored in non-trellis coded form, upon retrieving the program from a storage medium, a server may modulate and trellis encode the program in accordance with the modulation and coding type data conveyed in the program guide. The program may then be re-transmitted to other receivers which may use the modulation and coding type data in the program guide information to facilitate demodulation and decoding of the program. Similarly, in such a video server type application involving re-broadcast of programs, a server may re-modulate the program data for transmission in accordance with program guide information.

Figure 5:
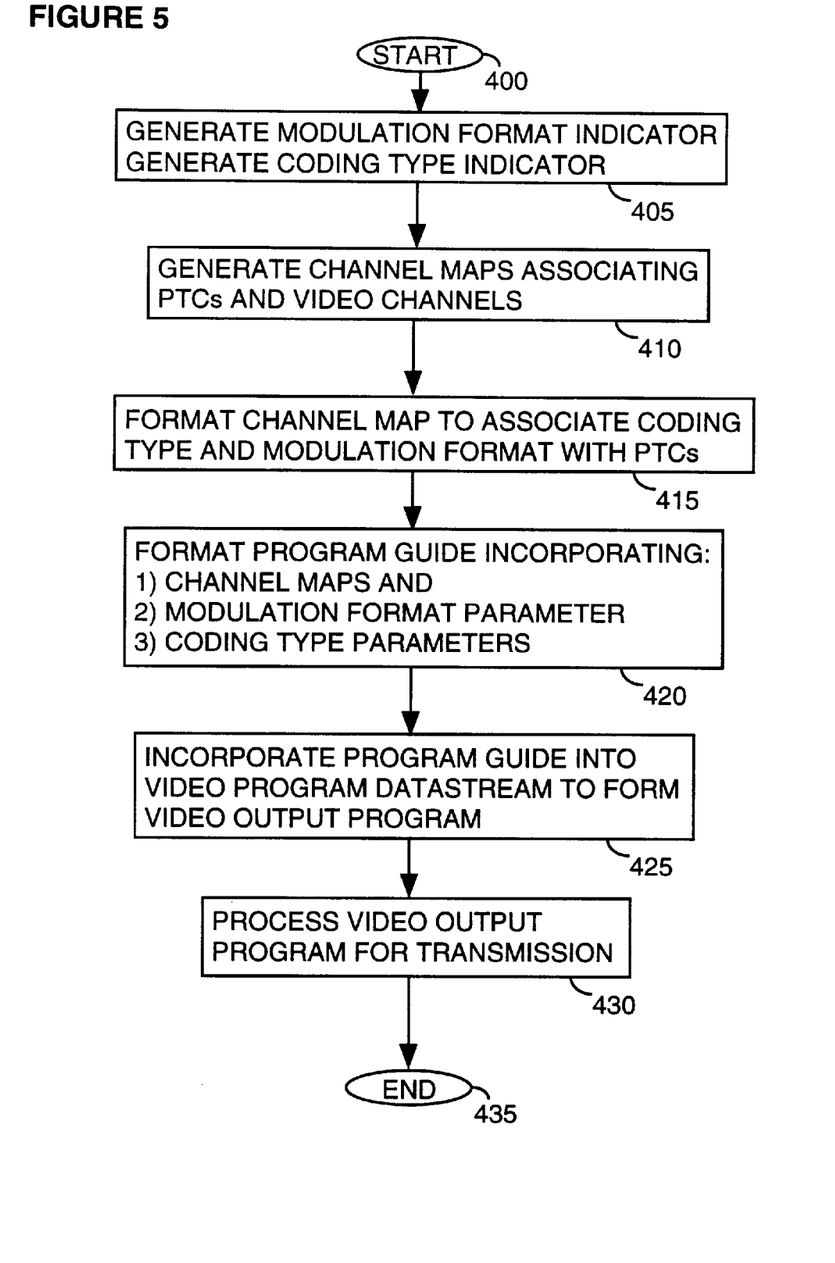
FIG. 5 shows a flowchart for a process for forming program guide information and incorporating the program guide information in a video program datastream for transmission in variable broadcast encoding formats.

FIG. 5 shows a flowchart for a process for forming program guide information and incorporating the program guide information in a video program datastream for transmission in variable broadcast encoding formats. Following the start at step 400 of FIG. 5, parameters are generated in step 405 indicating the modulation format and coding type to be used for transmission of each of the PTCs. In step 410, channel maps are generated identifying data packets that comprise individual video programs and their accompanying audio data that are to be transmitted on each of the PTCs. In step 415, the modulation format and coding type indication parameters, generated in step 405, are incorporated within the channel maps, thereby associating a PTC with a particular broadcast encoding format and particular video programs. The program guide format may be of a variety of types. For example, it may be comply with Program Specific Information (PSI) requirements specified in section 2.4.4 of the MPEG systems standard or it may comply with the high definition television (HDTV) signal standard *Digital Television Standard for HDTV Transmission* of Apr. 12, 1995, prepared by the United States Advanced Television Systems Committee (ATSC). Alternatively, it may be formed in accordance with proprietary or custom requirements of a particular system.

In step 420, program guide information is formed incorporating the channel maps and modulation format and coding type parameters. The program guide information is incorporated into a selected video program datastream in step 425 to form a video output program. In step 430, the video output program data is further processed to be suitable for transmission to another device such as a receiver, video server, or storage device for recording on a storage medium, for example. The processes performed in step 430 includes known encoding functions such as data compression Reed-Solomon encoding, interleaving, scrambling, optional trellis encoding, differential encoding and modulation. The process is complete and terminates at step 435.

The architecture of FIG. 1 is not exclusive. Other architectures may be derived in accordance with the principles of the invention to accomplish the same objectives. Further, the functions of the elements of system 12 of FIG. 1 and the process steps of FIGS. 2–5 may be implemented in whole or in part within the programmed instructions of a microprocessor. In addition, the principles of the invention apply to any form of MPEG or non-MPEG compatible electronic program guide. Further, although the disclosed system receives variable broadcast QAM modulation formats and trellis or non-trellis coded data, it is exemplary only. The principles of the invention may be applied to systems that receives other types of signal coding, not just optional trellis coding and other modulation formats not just QAM including forms of Pulse Amplitude Modulation (PAM).

What is claimed is:

1. A method of formatting video data to be suitable for output on one of a plurality of output channels and in one of a plurality of encoding formats, comprising the steps of:
   a) forming program guide information including a channel map associating an output channel with a video program, said program guide information associating said channel map with an encoding format;
   b) incorporating said program guide information and said video data into a datastream; and
   c) providing said datastream to an output channel.

2. A method according to claim 1, wherein
said forming step comprises forming program guide information including a plurality of channel maps, wherein said channel maps include a first channel map associating a first number of output channels with a first encoding format and a second channel map associating a different second number of output channels with a second encoding format.

3. A method according to claim 1, wherein
said forming step further includes forming program guide information wherein said channel map associates a plurality of video programs with an output channel.

4. A method according to claim 1, wherein
said forming step further includes the step of incorporating in said program guide information a parameter indicative of coding type.

5. A method according to claim 4, wherein
said parameter indicates trellis or non-trellis coding.

6. A method according to claim 4, wherein
said parameter indicates error correction coding.

7. A method according to claim 1, wherein
said forming step further includes the step of incorporating in said program guide information a parameter indicative of modulation format.

8. A method according to claim 7, wherein
said parameter indicates modulation format symbol constellation size.

9. A method of forming program guide information for video program data to be output on one of a plurality of output channels and in one of a plurality of encoding formats, comprising the steps of:
   a) generating a parameter indicative of an encoding format;
   b) generating a channel map associating an output channel with a video program;
   c) combining said encoding format parameter and said channel map in a program guide;
   d) formatting said program guide to associate said channel map with an encoding format; and
   e) incorporating said program guide and said video program data into a datastream.

10. A method according to claim 9, further including the step of:
generating a plurality of channel maps, wherein said channel maps include a first channel map with a first number of output channels and a second channel map with a different second number of output channels.

11. A method according to claim 10, further including the step of:
formatting said program guide to associate said first channel map with a first encoding format and to associate said second channel map with a second encoding format.

12. A method according to claim 9, wherein said step of generating a channel map comprises generating a channel map associating a plurality of video programs with said output channel.

13. A method according to claim 9, wherein
said step of generating an encoding format parameter comprises generating a parameter indicative of coding type.

14. A method according to claim 13, wherein
said parameter indicates trellis or non-trellis coding.

15. A method according to claim 13, wherein
said parameter indicates error correction coding.

16. A method according to claim 9, further including the steps of:
generating a parameter indicative of modulation format; and
incorporating said modulation format parameter in said program guide.

17. A method according to claim 16, wherein
said modulation format parameter indicates modulation format symbol constellation size.

18. A storage medium containing digital data representing video information comprising:
a video program; and
program guide information associated with said program and containing parameters suitable for use in decoding said video program following retrieval of said video program from said storage medium, said parameters including:
a parameter indicative of coding type; and
a parameter indicative of modulation format.

19. A storage medium according to claim 18, wherein
said data format includes a channel map associating said video data with a transmission channel, and
said data format also associates said channel map with a transmission encoding format.

20. A storage medium according to claim 18, wherein said coding type parameter indicates coding type.

21. A storage medium according to claim 20, wherein said coding type parameter indicates error correction coding type.

22. A storage medium according to claim 20, wherein said coding type parameter indicates trellis or non-trellis coding.

23. A storage medium according to claim 18, wherein said modulation format parameter indicates modulation format symbol constellation size.

24. A storage medium according to claim 18, further including:
a plurality of channel maps, wherein said channel maps include a first channel map associating a first number of transmission channels with a first transmission encoding format and a second channel map associating a different second number of transmission channels with a second transmission encoding format.

25. A storage medium according to claim 18, wherein said channel map associates a plurality of video programs with an output channel.

26. A storage medium data format according to claim 18, wherein
said decoding said video data for storage on said storage medium comprises demodulating and decoding said video data for storage on said storage medium.

* * * * *